United States Patent [19]

Boyd

[11] Patent Number: 4,926,041
[45] Date of Patent: May 15, 1990

[54] OPTICAL SCANNER

[75] Inventor: David W. Boyd, Greeley, Colo.
[73] Assignee: Hewlett-Packard Company, Palo Alto, Calif.
[21] Appl. No.: 383,463
[22] Filed: Jul. 20, 1989
[51] Int. Cl.$^5$ .............................................. G01J 3/50
[52] U.S. Cl. .................................. 250/226; 250/578.1
[58] Field of Search ................ 250/226, 578; 358/482, 358/483, 497, 75

[56] References Cited

U.S. PATENT DOCUMENTS

| 4,682,042 | 7/1987 | Igarashi | 250/578 |
| 4,709,144 | 11/1987 | Vincent | 250/226 |
| 4,783,696 | 11/1988 | Neumann | 250/226 |
| 4,870,268 | 9/1989 | Vincent | 250/226 |

OTHER PUBLICATIONS

U.S. Patent Application Serial No. 145,174 filed 1/19/88 of Vincent et al.

PC World, May 1988, pp. 154 and 155.

Primary Examiner—David C. Nelms
Assistant Examiner—Sherrie Hsia

[57] ABSTRACT

An optical scanner device for producing machine-readable data representative of a color image of scanned objects including a narrow width, elongate light slit for enabling transmission of an imaging light beam from a narrow band portion of an object which is scanned; a lens for focusing the imaging light beam; a beam splitter for separating the imaging light beam into a plurality of color component beams; a purality of parallel, linear photosensor arrays located on a common sensor plane and spaced apart at equal intervals for accepting color component images; the light slit and lens being constructed and arranged whereby the width of each color component image on the common sensor plane is no more than about the interval spacing of the photosensor arrays and no less than about one-half the interval spacing of the pohotsensor arrays.

10 Claims, 7 Drawing Sheets

OPTICAL SCANNER

BACKGROUND OF THE INVENTION

The present invention relates generally to optical scanners and, more particularly, to color optical scanners of the type employing a light beam color separator, or "beam splitter."

Optical imaging devices which utilize a chromatic beam splitter consisting of composited dichroic beam splitter plates which separate a light beam into parallel color component beams are disclosed in U.S. Pat. No. 4,709,144 of Kent J. Vincent and U.S. patent application Ser. Nos. 145,174 and 333,850, filed Jan. 19, 1988, and Apr. 4, 1989, respectively, of Kent J. Vincent and Hans D. Neuman, which are all hereby specifically incorporated by reference for all that is disclosed therein.

These reference disclose the use of a slit aperture to define an imaging light beam which is projected from a linear object. The imaging light beam is separated into multiple, spaced-apart, parallel component line images of different colors by the chromatic beam splitter. Each color component line image is projected onto an associated linear photodiode array. Each of the linear photodiode arrays lie in a common plane and are separated by a distance proportionate to the thickness of the individual composite glass plates of the beam splitter.

Applicant has discovered, in certain applications of the color imaging assembly disclosed in U.S. Pat. No. 4,709,144 and patent application Ser. Nos. 145,174 and 333,850, that problems arise with respect to the registration of the color component line images with the associated linear photodiode arrays. Applicant has also discovered that the beam splitter described in the above-listed references produces secondary, off-color component images which are positioned between primary color component images. The existence of these secondary component images further complicates the previously-mentioned registration problem.

SUMMARY OF THE INVENTION

The present invention is directed to a color scanner employing a light slit, a chromatic beam splitter, and coplanar, linear photosensor arrays in which problems of registration between color component images and associated linear photosensor arrays have been minimized. The scanner of the present invention utilizes a light slit which provides precisely-sized color component images which are sufficiently broad to enable registration between the primary color component images and associate linear photosensor arrays to be maintained during minor alignment fluctuations such as those produced by heating and cooling of system components. Problems associated with impingement of secondary light components on the photosensor arrays have been minimized through the selection of an aperture slit width which produces a component image having a width which is no larger than approximately one-half the interval spacing between associated linear photosensor arrays. Scanner component alignment problems have been minimized through mounting of all optical components of the system, including the aperture, in a unitary carriage assembly.

Thus, the invention may comprise an optical scanner device for producing machine-readable data representative of color images of scanned objects. The scanner includes a narrow width, elongate light slit for enabling transmission of an imaging light beam from a narrow band portion of an object which is scanned. A lens focuses the imaging light beam. A beam splitter is provided for separating the imaging light beam into a plurality of color component beams. A plurality of parallel, linear photosensor arrays located on a common sensor plane and spaced apart at equal intervals accept color component images associated with the component beams. The light slit and the lens are constructed and arranged whereby the width of each color component image projected onto the common sensor plane is no more than about the interval spacing of the linear photosensor arrays and no less than about one-half the interval spacing of the linear photosensor arrays.

The invention may also comprise an optical scanner imaging assembly for use in an optical scanner of the type having a fixed, transparent support plate for stationarily supporting media to be scanned. The imaging assembly includes a carriage positioned opposite one surface of the transparent plate which is displaceable parallel thereto and which supports all optical components of the imaging assembly. A laterally extending light slit is fixedly mounted on the carriage and transmits a narrow width band of imaging light reflected from an oppositely positioned portion of the media. Mirrors are fixedly mounted on the carriage for directing the imaging light along a predetermined light path. A lens, located at a predetermined position along the light path and fixedly mounted on the carriage, focuses the imaging light. A color separator, fixedly mounted on the carriage, splits the imaging light into separate imaging light color components. A coplanar, linear photosensor array is fixedly mounted on the carriage and generates an electrical signal representative of color component images of the imaging light color components focused.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
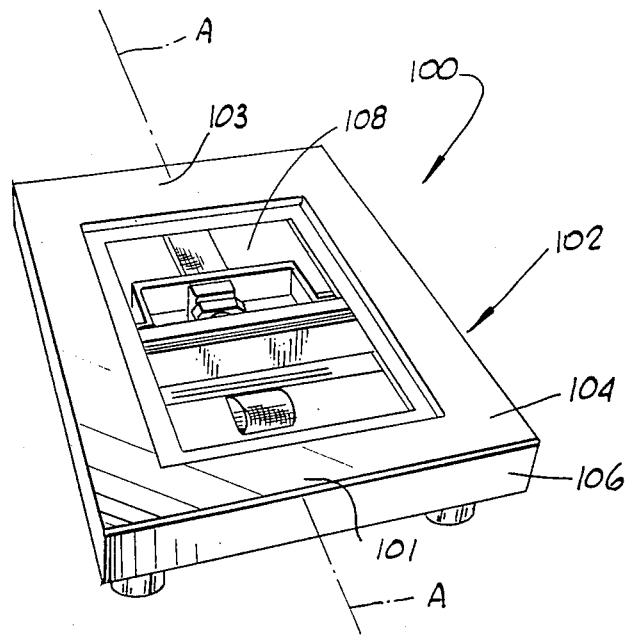
FIG. 1 is a perspective view of an optical scanner.

FIG. 1 illustrates an optical scanner 100 of a type adapted to produce machine readable data representative of a color image of an object which is scanned. The machine readable data produced by the optical scanner 100 is adapted to be received and used by a digital computer in a conventional manner, e.g. the data may be stored on a computer memory device or may be used to produce a color display of the object on a CRT or a color electrostatic print, etc.

Figure 2:
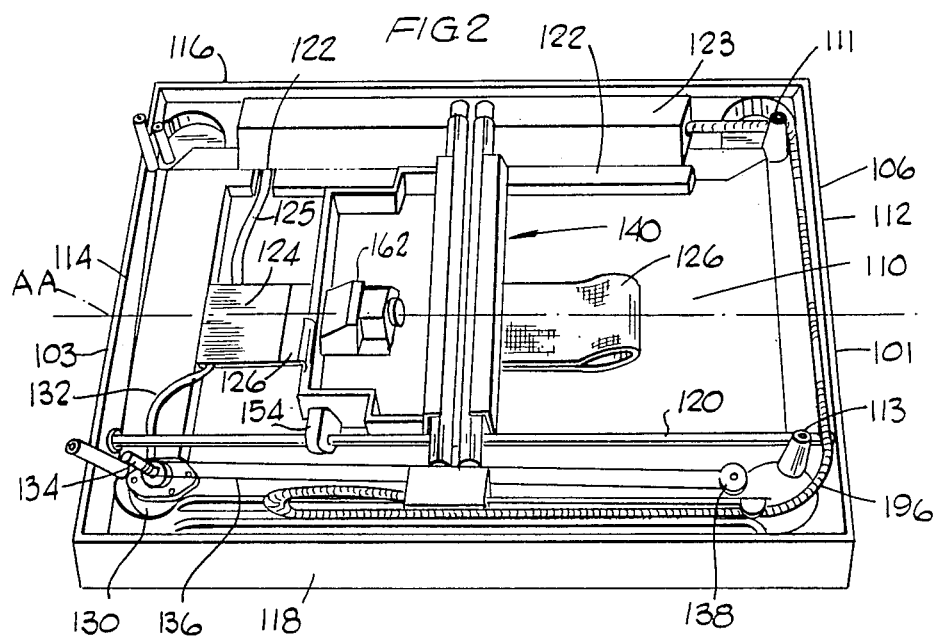
FIG. 2 is a perspective view of an optical scanner with an upper panel removed.

The optical scanner 100 comprises a scanner housing 102 having a forward end 101, a rear end 103 and a central longitudinal axis AA, FIGS. 1 and 2. The housing includes a relatively flat upper panel member 104 and a lower housing member 106, FIGS. 1 and 2. The upper panel member 104 comprises a transparent plate 108 which may be approximately laterally centered therein. The transparent plate 108 is positioned relatively nearer to the forward end 101 than the rear end 103 of the scanner housing. The forward edge of the transparent plate member 108 may be e.g. 72 mm from the forward terminal edge of the scanner housing. The rear edge of the transparent plate 108 may be e.g. 160 mm from the rear terminal edge of the scanner housing.

The lower housing member 106 comprises a generally rectangularly shaped bottom wall 110. A front wall 112, rear wall 114 and lateral sidewalls 116, 118 are integrally formed with the bottom wall 110 and project upwardly therefrom. Post members 111, 113 etc. are provided for attaching the upper panel member to the lower housing member. In one preferred embodiment of the invention the overall length of the housing is 575 mm, the lateral dimension of the housing is 408 mm and the distance from the bottom wall 110 to the upper panel member 104 is 105 mm.

As best illustrated in FIG. 2, a longitudinally extending shaft 120, which may be positioned e.g. 36 mm above the housing bottom wall 110 is supported at opposite ends thereof by brackets mounted on the front and rear housing walls 112, 114. Shaft 120 may be located 79 mm from lateral sidewall 118. A longitudinally extending riser 122, which may be integrally formed with the bottom wall 110 may be positioned e.g. 80 mm from lateral sidewall 116. The upper surface of the riser 122 may be positioned e.g. 37 mm above bottom wall 110.

As further illustrated in FIG. 2, an electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 162 mounted in a carriage assembly 140 through an electrical cable 126.

A reversible electric motor 130 which receives power through electrical supply cable 132 connected to controller board 124 is fixedly mounted the bottom wall at a location proximate lateral wall 118 at a rear end portion of the housing member. The reversible electric motor 130 has a vertical motor shaft 134 and is controlled by the controller board. A carriage assembly drive cable 136 has terminal ends thereof wound about vertical motor shaft 134. An intermediate portion of the cable 136 is received about a pulley 138 which is mounted proximate a forward end of the housing.

As best illustrated in FIG. 2, a scanner carriage assembly 140 is longitudinally displaceably mounted on shaft 120 and riser 122. The scanner carriage assembly 140 is attached to cable 136 which produces reciprocal, longitudinal movement thereof.

Figure 3:
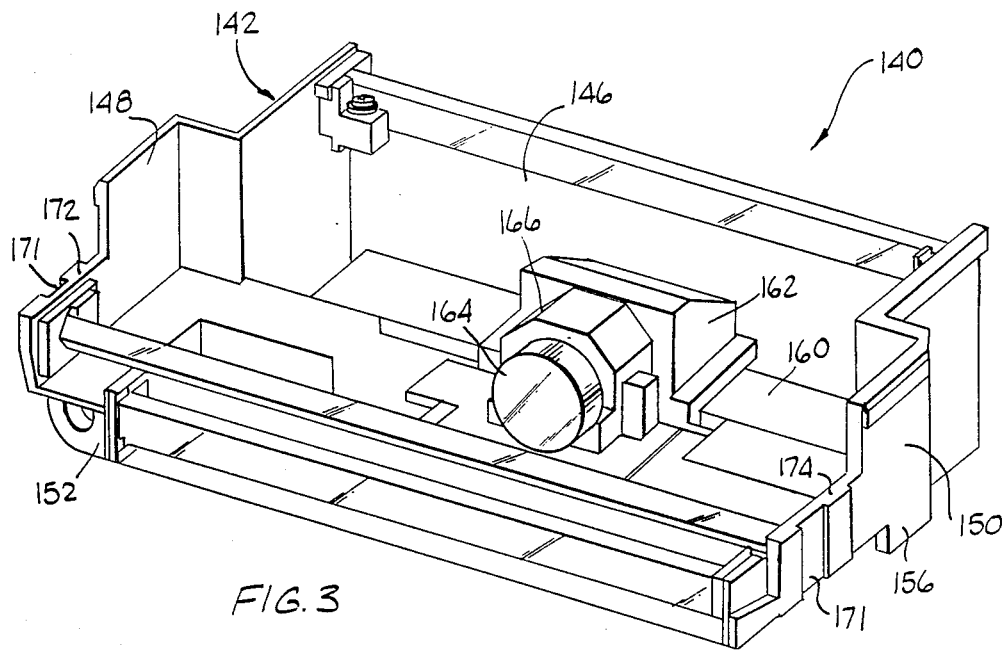
FIG. 3 is a perspective view of an optical scanner carriage assembly with a modular light source and light slit assembly removed therefrom.
Figure 6:
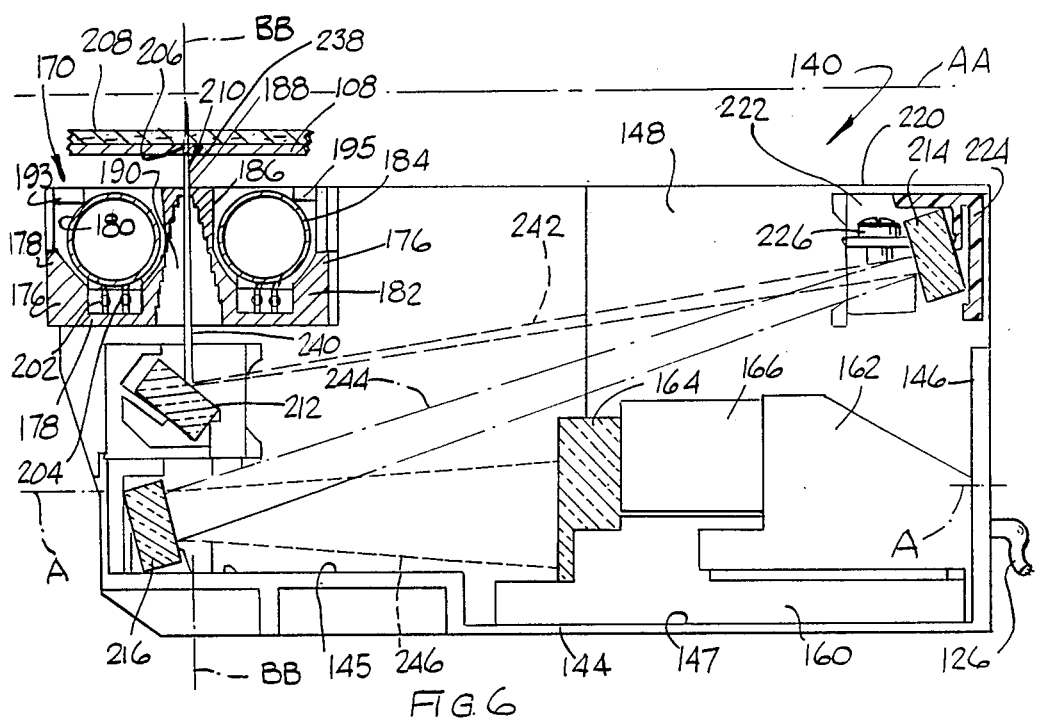
FIG. 6 is a cross-sectional elevation view of an optical scanner carriage assembly illustrating a fixed light path extending from a light slit to a focusing lens.

As best illustrated in FIG. 3, the scanner carriage assembly comprises a carriage body 142 which is preferably constructed from a rigid high strength material, such as aluminum, stainless steel or the like. The body comprises a bottom wall 144 having a two tier structure, including a forward upper tier 145 and rear lower tier 147, as illustrated in FIG. 6. The carriage has a vertical rear wall 146, a vertical first lateral sidewall 148 and a vertical second lateral sidewall 150, FIG. 3. The overall longitudinal dimension of carriage body 142 may be e.g. 146 mm. The maximum width of the carriage body 142 may be e.g. 244 mm.

First and second guide ring members 152, 154, FIGS. 2 and 3, are fixedly attached to the carriage body 142 and are adapted to slidingly receive longitudinally extending shaft 120. A vertically and longitudinally extending guide member 156, which may be integrally formed with lateral sidewall 150, is adapted to be positioned adjacent to an outboard portion of riser 122. The bottom wall 144 of the carriage body is slidingly supported on riser 122. Guide member 156 ensures proper longitudinal tracking of the carriage body 142 along the vertical riser 122.

A centrally mounted support block 160 is fixedly attached to bottom wall 144, FIG. 6. A light processing assembly 162 is fixedly attached to support block 160. The light processing assembly 162 in one preferred embodiment comprises a dual trichromatic beam splitter 250 and photosensor assembly 252, FIG. 9, which may be identical to the type described in U.S. Pat. Nos. 4,709,144 and 4,806,750 of Kent D. Vincent, and in U.S. patent application Ser. No. 07/145,174 filed Jan. 19, 1988, of Kent D. Vincent and Hans D. Neuman, and U.S. patent application Ser. No. 333,850, filed Apr. 4, 1989, of Kent D. Vincent and Hans D. Neuman, each of which is hereby specifically incorporated by reference for all that is disclosed therein. A double convex lens assembly 164 is adjustably mounted at a position directly forward of light processing assembly 162 by a tubular mounting assembly 166. In one preferred embodiment of the invention the double convex lens 164 assembly comprises a lens 165, FIG. 9, having a 31 mm diameter, a 42 mm focal length, and a magnification of 0.126.

Figure 4:
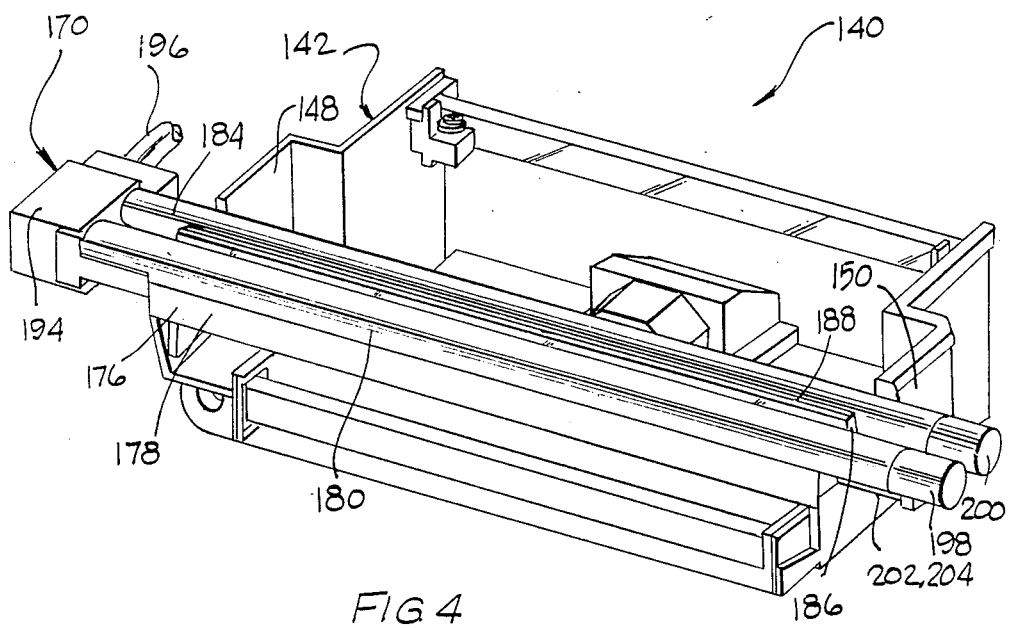
FIG. 4 is a perspective view of an optical scanner carriage assembly.

As best illustrated by FIGS. 4 and 6, a modular light source and light slit or aperture assembly 170 is stationarily mounted at a forward location on the carriage body 140. In the preferred embodiment of the invention illustrated by the drawings, the lateral sidewalls 148, 150 each comprise a forward cut-out region therein which define horizontal surfaces 172, 174 adapted to support assembly 170. A locking assembly 171 is associated with each support surface 172, 174 and is adapted to cooperate with a catch assembly (not shown) provided on a lower surface of the modular light source and light slit assembly 170 to hold assembly 170 in stationary relationship with the carriage body at a predetermined location thereon.

The modular light source and light slit assembly 170 comprises an elongate member 176 having a generally W-shaped cross-section, as shown by FIG. 6. The elongate member 176 has a forward portion 178 having generally U-shaped cross-section which is adapted for supporting a first fluorescent bulb 180 which may have a diameter of 15.5 mm. The elongate member 176 also comprises a rear portion 182 having a generally U-shaped cross-section for supporting a second fluorescent bulb 184. The elongated member 176 has a central riser portion 186. A narrow light slit or aperture 188 is located at the top of riser portion 186 and extends substantially the full length thereof. The light slit 188 communicates with a generally inverted V-shaped cavity 190 within the central riser portion 186. The inverted V-shaped cavity 190 also extends substantially the full length of the riser. The narrow slit 188 may comprise a length, measured transversely with respect to the housing longitudinal axis AA, of 234 mm. The slit width, measured parallel to axis AA, may be e.g. 0.8 mm. The inverted V-shaped cavity may have a width at the upper end thereof of e.g. 0.8 mm and a width at the bottom end thereof of e.g. 7.5 mm and may have a height of e.g. 215 mm. The surface of the inverted V-shaped cavity 190 may have a generally inverted stair step shape, each inverted stair step having a height of e.g. 2 mm and a horizontal dimension of, e.g., 0.2 mm. An electrical socket member 194, FIG. 4, is fixedly attached to one end of elongate member 176 and comprises two conventional fluorescent bulb female sockets therein adapted to receive conventional male socket portions of fluorescent bulbs 180 and 184, respectively. A flexible power cable 196 is operably attached to socket member 194 for providing electrical current to bulbs 180, 184. Independent end sockets 198, 200 are provided at the end of each fluorescent bulb and make electrical contact with male socket portions thereof. Each socket 198, 200 is connected by a pair of lead wires 202, 204 to an associated portion of socket member 194. Shield members 193, 195 (shown in FIG. 6 only) may be provided to reflect light from the bulbs 180, 184 toward an object such as color document 208, which is to be scanned.

Figure 7:
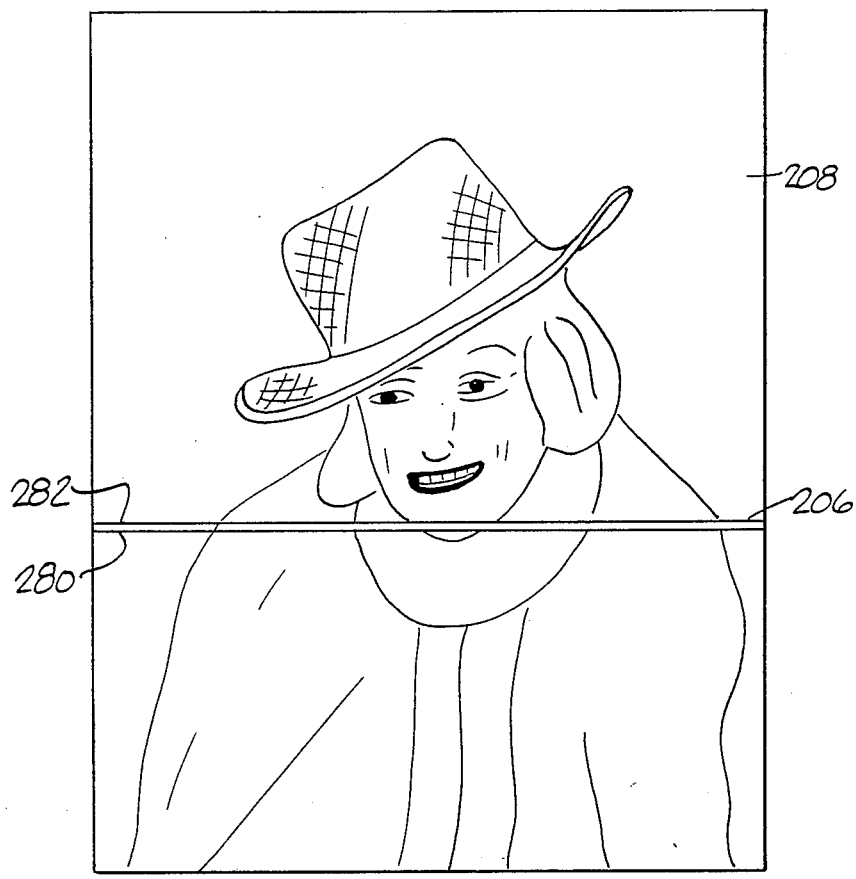
FIG. 7 is a plan view of a document which is scanned by an optical scanner.
Figure 8:
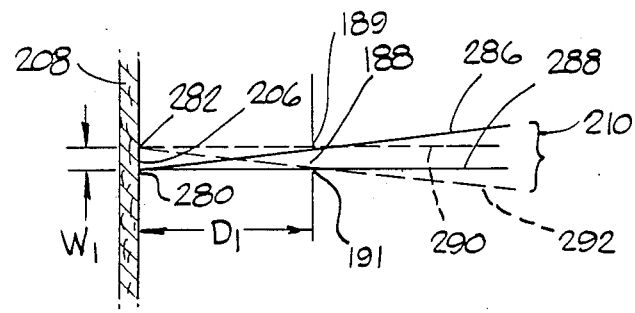
FIG. 8 is a schematic, cross-sectional elevation view illustrating a scanned object, a light slit, and a light beam extending from the scanned object through the light slit.

Light slit 188 passes light reflected from a narrow band region 206 of document 208 and blocks all other light reflected from the document, FIGS. 6-8. The region 206 from which light is reflected of course changes as scanner carriage assembly 140 moves relative to document 208. However, for purposes of explaining image formation, etc., it is helpful to visualize the scanner carriage assembly 140 and narrow band region 206 in a static position. Narrow band region 206 is sometimes referred to herein as "scan object" 206.

As illustrated by FIG. 6, some of the light from fluorescent bulbs 180, 184, which is reflected from a narrow band scan region 206 of document 208 and which ultimately enters lens 165 travels along a light path 210 which passes through slit 188 and inverted V-shaped cavity 190. Light path 210 is thereafter "folded" by a first mirror 212, a second mirror 214 and a third mirror 216 before passing through focusing lens 165. Light path 210 thereafter passes through tubular member 166 into light processing assembly 162 and terminates at photosensor assembly 252 therein, FIG. 9. Each mirror 212, 214, 216 may have a width of e.g. 127 mm and is held in position by a pair of mounting assemblies, e.g. 220, 221, FIG. 5, which may comprise a bracket member 222 which is fixedly attached to an associated lateral sidewall of the carriage assembly and a clip member 224 which attaches an end portion of each mirror to the associated bracket members 222. In the case of mirror 214, a mirror angular adjustment assembly 226 is also provided for adjusting the relative angular position of mirror 214 about an axis extending perpendicularly of axis AA. The mirror mounting assemblies may be identical to those which are specifically described in U.S. patent application Ser. No. 345,384, filed May 1, 1989, of David Wayne Boyd, which is hereby specifically incorporated by reference for all that is disclosed therein.

Figure 5:
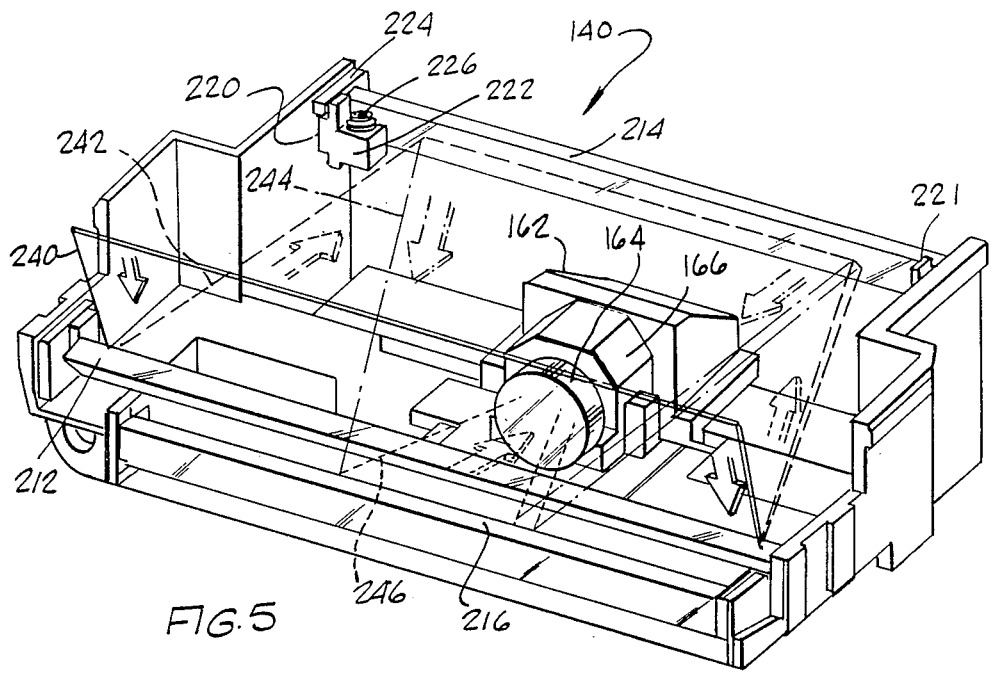
FIG. 5 is a perspective view of an optical scanner carriage assembly with a modular light source and light slit assembly removed therefrom, illustrating a fixed light path which extends from a light slit to a focusing lens.

As best illustrated in FIGS. 5 and 6, light path 210 comprises a first vertically downwardly extending light path portion 238 extending between scanned document 208 and light slit 188; a second vertically downwardly extending light path portion 240 extending from slit 188 to mirror 212; a third generally rearwardly and upwardly extending light path portion 242 extending between mirror 212 and mirror 214; a fourth generally downwardly and forwardly extending light path portion 244 extending between mirror 214 and mirror 216; and a fifth generally rearwardly extending light path portion 246 extending between mirror 216 and the forward surface of lens 165.

In one preferred embodiment of the invention the length of first light path portion 238 is 6.0 mm; the length of the second light path portion 240 is 35.7 mm; the length of the third light path portion 242 is 124.4 mm; the length of the fourth light path portion 244 is 32.8 mm; and the length of the fifth light path portion 246 is 61.0 mm. The inclination of the first and second light path portions with respect to a vertical plane BB may be 0 degrees. The inclination of the center line of the third light path portion 242 with respect to vertical plane BB may be 80.6 degrees, the inclination of the fourth light path portion 244 with respect to vertical plane BB may be 71.3 degrees, and the inclination of a fifth light path portion 246 with respect to vertical plane BB may be 90 degrees.

The lateral convergence of the light path with respect to the field of view of lens 164 is best illustrated in FIG. 5. This lateral convergence may be from a dimension of 212 mm at a point where light enters slit 188 to a lateral dimension of 190 mm at the first mirror 212, to a lateral dimension of 114 mm at the second mirror 214, to a lateral dimension of 33 mm at the third mirror 216, to a lateral dimension of 10 mm at the forward surface of lens 165. The breadth (the dimension corresponding to the width of slit 188) of the light path viewed by lens 164 increases as it travels from slit 188 to the forward surface of the lens from a dimension of 0.8 mm at slit 188 to a dimension of 1.05 mm at the first mirror 212, to a dimension of 4.5 mm at the second mirror 214, to a dimension of 8.2 mm at the third mirror 216, to a dimension of 10 mm at the forward surface of lens 164.

As illustrated schematically by FIG. 9, light processing assembly 162 comprises a dual chromatic beam splitter 250 and a photosensor assembly 252 which may be identical to the beam splitter and photosensor array described with reference to FIG. 18 in U.S. patent application Ser. No. 333,850 filed Apr. 4, 1989, of Vincent et al., which is hereby specifically incorporated by reference for all that it discloses. The photosensor assembly 252 comprises three spaced apart, parallel, linear photosensor arrays 254, 256, 258 having longitudinal axes CC, DD, EE which are located in a common photosensor plane XX. The beam splitter 250 is disposed within light path 210 at the rear of lens 165. The beam splitter 250 bends the composite light beam traveling along light path 210 90° and separates it into parallel red, green, and blue component beams. The photosensor assembly is positioned perpendicular to the paths of the component beams at one focal length distance from the lens (as measured along the light path). A red component image 260 of the scan object 206 is projected onto the photosensor assembly 252 in overlying relationship with linear photosensor array 254 as shown in FIG. 10. A green component image 262 of scan object 206 is projected onto the photosensor assembly in overlying relationship with linear photosensor array 256. A blue component image 264 of the scan object 206 is projected onto the photosensor assembly in overlying relationship with linear photosensor array 258.

In one preferred embodiment of the invention, the beam splitter 250 utilizes a plurality of equal thickness glass plates each having a plate thickness of approximately 0.1 mm: thus producing component images 260, 262, 265 which are spaced apart approximately 0.3 mm between centerlines HH, II and JJ thereof. (The spacing of component images is approximately equal to the beam splitter individual glass thickness multiplied by twice the square root of two in a beam splitter assembly of the type illustrated at 250, as described in detail in U.S. patent application of Vincent et al., supra.)

Figure 10:
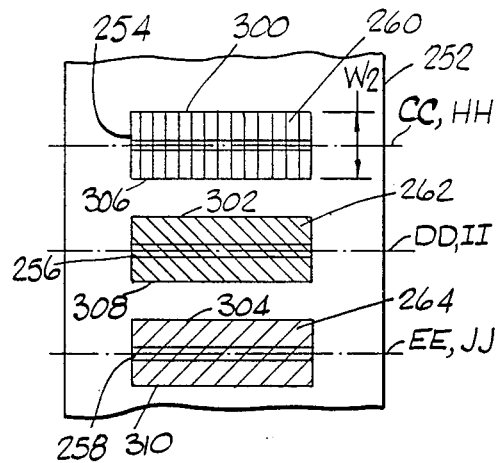
FIGS. 10-15 are top plan views of a photosensor assembly and color component images projected thereon.
Figure 11:
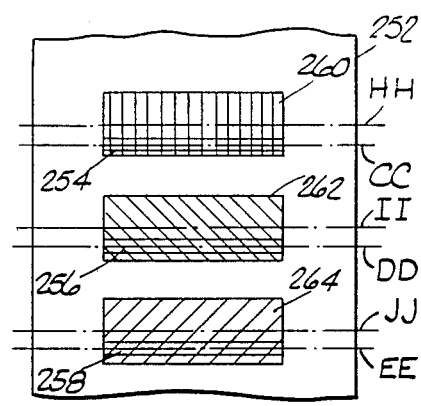

As illustrated in FIG. 10, the photosensor assembly 252 is located such that the central longitudinal axes CC, DD and EE of the linear photosensor arrays are coaxial with component image centerlines HH, II, JJ, respectively, during an "intermediate temperature operating state" of scanner 100. Applicant has discovered that, during scanner operation, differential heating and cooling of various scanner components, as well as other tolerance fluctuations, cause relative shifting between the axes CC, DD and EE of the linear photosensor arrays and the centerlines HH, II and JJ of the components images as illustrated in FIG. 11. Thus, photosensor assembly 252 is positioned at a location approximately centered between the extremes of shifting movement of the components images which occur during a typical warm-up and cool-down operating cycle of the scanner. Due to the relatively close spacing, e.g. 0.2 to 0.3 mm between linear photosensor arrays, the selection of a proper component image width is critical to the operation of the scanner.

Each linear photosensor array 254, 256, 258 produce an electronic signal which is interpreted by the scanner data processing system, as being representative of the color of the particular component image which is designed to overlie that particular linear photosensor array.

Figure 12:
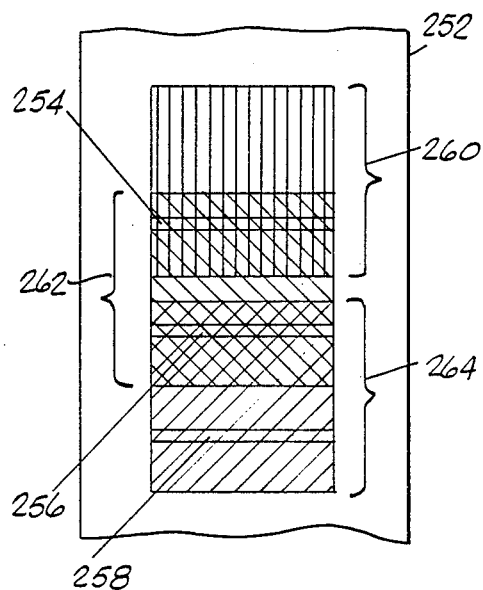

Thus, if component images have widths which are so large that they overlap, a linear photosensor array which is exposed to the overlapping areas of two component images will generate false data. Such an error state is shown in FIG. 12 in which shifting displacement of overlapping component images has caused overlapping portions of the red and green component images 260, 262 to impinge on the red sensor 254 and has caused overlapping portions of the green and blue component images 262, 264 to impinge on the green sensor 256.

Figure 13:
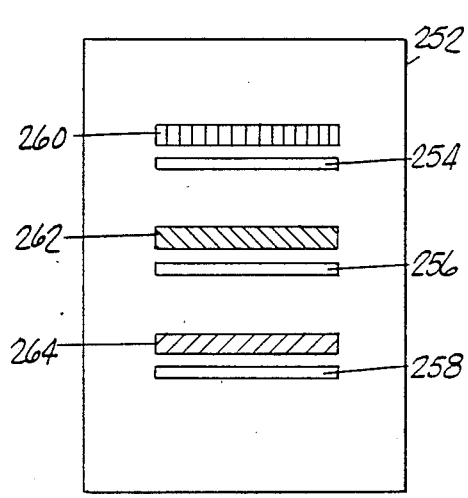

On the other hand, as illustrated in FIG. 13, if the component images have an extremely narrow width, then the slightest shifting movement of the component images relative to the linear photosensor arrays causes loss of registration therebetween, thus producing an error condition.

Figure 14:
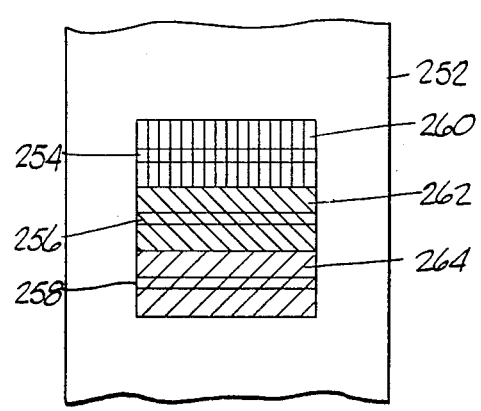

The optimum component image width for a system producing only three equal width primary component images, as illustrated in FIG. 14, is a component image width which is equal to the distance between the central longitudinal axes of the photosensor arrays. Such an image width enables the maximum possible amount of displacement between component image centerlines and sensor longitudinal axes before an error condition occurs, i.e. a centered image may be displaced up to one-half of the distance between sensor axes before an error condition occurs.

Figure 15:
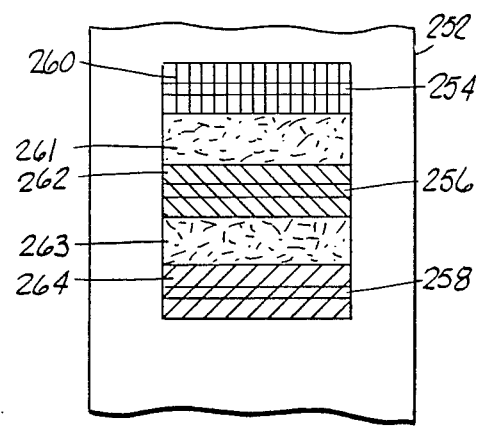

However, applicants have discovered that, for reasons relating to imperfect performance of filter coatings, at least some beam splitters of the type described in the above-cited patent of Vincent and patent application of Vincent et al. produce bands 261, 263 of secondary, off-color light, FIG. 15, between the red and green component images 260, 262 and between the green and blue component images 262, 264, respectively. The light in bands 261, 263 is not exactly representative of the light in any of the component images 260, 262, 265. Thus, any impingement of light bands 261, 263 upon a linear photosensor array produces an error condition. It has been found that these off-color light bands 261, 263 are approximately centered between adjacent component images and have a width approximately equal to the width of individual component images. Thus, it has been found that the optimum component image width in situations when such off-color light bands occur is an image width equal to approximately one-half of the distance between longitudinal axes of adjacent linear photosensor arrays, as shown in FIG. 15.

Certain parameters which are critical to the selection of component image width will now be discussed with reference to FIGS. 7-9. FIG. 7 shows a plan view of a narrow band region 206 of a document from which light is reflected by scanner bulbs 180, 184 (FIG. 6). This narrow band region is also referred to herein as "scan object 206." Light from this region and only this region provides the light beam which travels along light path 210 and which is focused and separated by lens 164 and beam splitter 250 to form red, green and blue component images 260, 262, 264 on photosensor assembly 252. Other light from bulbs 180, 184 which is reflected from document 208 is blocked, by member 176, from entering lens 165. Scan object 206 has a first linear border or "object line" 280 and a second linear border or "object line" 282 positioned opposite of edges 189, 191 of light slit 188. A cross-sectional view of scan object 206 and light slit 188 are shown schematically in FIG. 8, with glass support plate 108 (FIG. 6) removed for clarity. FIG. 8 shows two peripheral planes 286, 288 formed by rays of light radiating from object line 280 which pass through slit 188 and also shows two peripheral planes 290, 292 formed by rays of light radiating from object line 282. Plane 286 and plane 292 define the outer boundaries of light path 210 described above. (The width of light slit 188 and the distance between scan object 206 and slit 188 have been greatly exaggerated in FIG. 8 for illustrative purposes. In true scale, planes 286 and 292 would be seen to be much more nearly parallel.)

Figure 9:
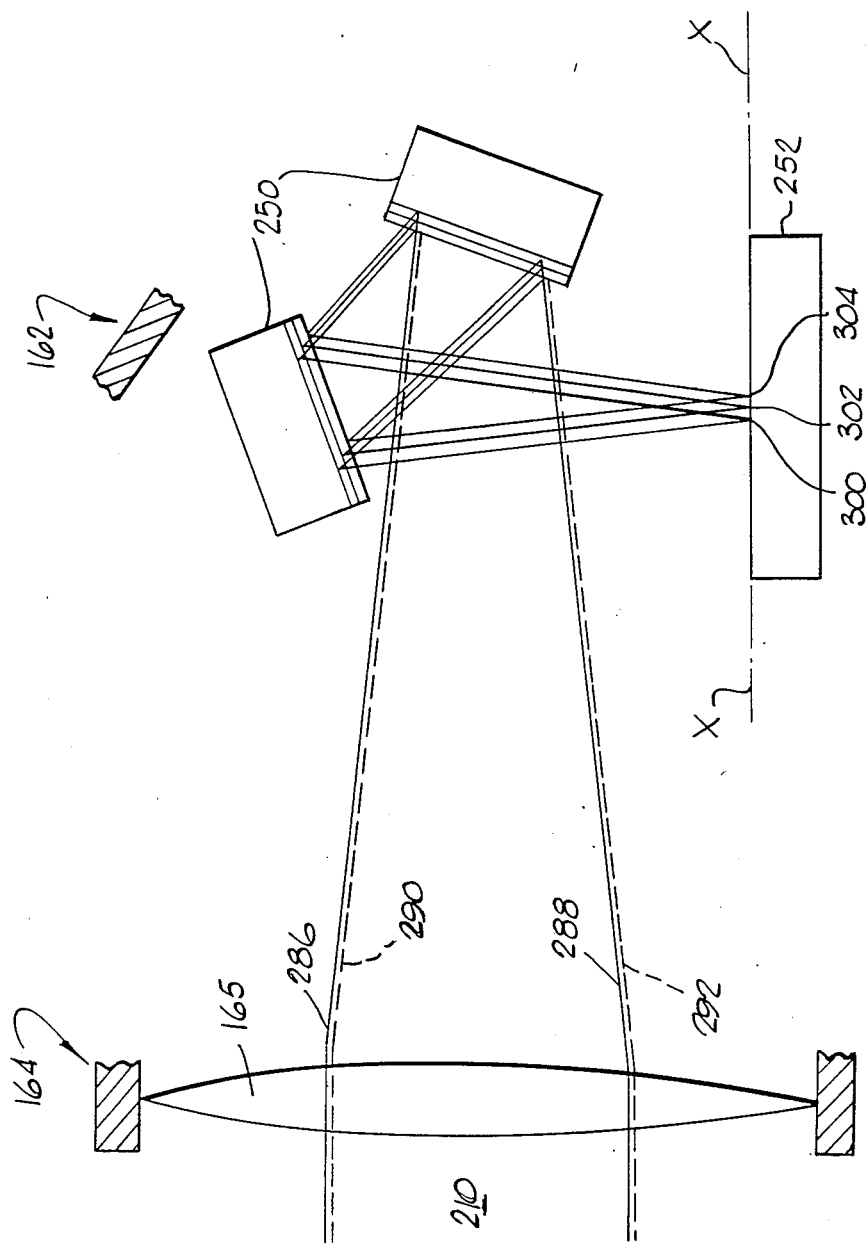
FIG. 9 is a schematic, side elevation view illustrating the operation of a focusing lens, beam splitter assembly, and photosensor assembly.

FIG. 9 illustrates the focusing of component line images of object lines 280 and 282 on the photosensor assembly 252. Splitting of the light beam associated with light rays in planes 286 and 288 and emanating from object line 280 into component beams which are focused on the photosensor assembly 252 to form component line images 300, 302, 304 (FIGS. 9 and 10) are shown in detail in FIG. 9. The splitting and projection of component line images of the light beam associated with light rays in planes 290 and 292 and emanating from object line 282 are not shown in FIG. 9 in order to avoid clutter. However, the component line images of object line 282 are shown in FIG. 10 as line images 306, 308, 310.

Thus, by selecting the appropriate parameters, a desired width for the component scan images may be selected. The width of each component scan image, e.g. the distance between image lines 300 and 306, may be expressed as:

$$W_2 = W_1 M \left( 1 + \frac{D_1}{D_2 - D_1} \right)$$

where:
$W_2$ is the width of each component scan image;
$W_1$ is the width of slit 188;
M is the magnification of lens 165;
$D_1$ is the light path distance between scan object 206 and slit 188; and
$D_2$ is the light path distance between from light slit 188 to the center of lens 165.

In a typical application, the light slit 188 is positioned as close to the glass plate 108 (FIG. 6) supporting document 208 as physically possible, and thus the distance $D_1$ is very small compared to the distance between the light slit 188 and lens 165. As a result, the value of the term $D_1/(D_2-D_1)$ is generally so small as to be negligible. Thus, $W_2=W_1M$ is a good approximation. Thus, the width of a component image is approximately equal to the width of light slit 188 multiplied by the magnification of lens 165, or, conversely, the width of the light slit 188 is approximately equal to the width of a component image divided by the magnification of lens 165. In the preferred embodiment of the invention, the width of the component images are no greater than approximately the spacing interval between the photosensors and no less than approximately half the spacing interval between photosensors. Thus, the width of light slit 188 multiplied by the magnification of lens 165 is no greater than approximately the spacing interval between the photosensors and is no less than approximately half the spacing interval between photosensors. Expressed slightly differently, the spacing interval between linear photosensor arrays is no less than approximately the width of the light slit multiplied by the lens magnification and is no more than approximately twice the width of the light slit multiplied by the lens magnification.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical scanner device for producing machine-readable data representative of color images of scanned objects, comprising:
    (a) narrow width, elongate light slit means for enabling transmission of an imaging light beam from a narrow band portion of an object which is scanned;
    (b) lens means for focusing said imaging light beam;
    (c) beam splitter means for separating said imaging light beam into a plurality of color component beams;
    (d) a plurality of parallel, linear photosensor array means located on a common sensor plane and spaced apart at equal intervals for accepting color component images projected by said color component beams; and
    (e) said light slit means and said lens means being constructed and arranged whereby the width of each color component image on said common sensor plane is no more than about said interval spacing of said photosensor array means and no less than about one-half said interval spacing of said photosensor array means.

2. The invention of claim 1, said light slit means and said lens means being constructed and arranged whereby the width of each color component image on said common sensor plane is approximately equal to half said interval spacing of said photosensor array means.

3. The invention of claim 1 wherein said light slit means, said lens means, said beam splitter means, and said linear photosensor array means are fixedly positioned relative one another in a common carriage assembly.

4. The invention of claim 3, said carriage assembly further comprising a plurality of fixedly mounted mirrors disposed between said light slit means and said lens means and adapted to reflect said imaging light beam from said light slit means to said lens means.

5. The invention of claim 4, said carriage means being linearly displaceable relative a support plate adapted to stationarily support an object which is to be scanned.

6. The invention of claim 2 wherein said light slit means, said lens means, said beam splitter means, and said linear photosensor array means are fixedly positioned relative one another in a common carriage assembly.

7. The invention of claim 6, said carriage assembly further comprising a plurality of fixedly mounted mirrors disposed between said light slit means and said lens means and adapted to reflect said imaging light beam from said light slit means to said lens means.

8. The invention of claim 7, said carriage means being linearly displaceable relative a support plate adapted to stationarily support an object which is to be scanned.

9. An optical scanner device for producing machine-readable data representative of color images of scanned objects, comprising:
    narrow width, elongate light slit means for enabling transmission of an imaging light beam from a narrow band portion of an object which is scanned;
    (b) lens means for focusing said imaging light beam;
    (c) beam splitter means for separating said imaging light beam into a plurality of color component beams;
    (d) a plurality of parallel, linear photosensor array means located on a common sensor plane and spaced apart at equal intervals for accepting color component images projected by said color component beams; and
    (e) the interval spacing of said linear photosensor array means being no less than approximately the width of said light slit means multiplied by the magnification of said lens means and being no more than approximately twice the width of said light slit means multiplied by the magnification of said lens means.

10. The invention of claim 9, the interval spacing of said linear photosensor array means being approximately equal to twice the width of said light slit means multiplied by the magnification of said lens means.

* * * * *

UNITED STATES PATENT AND TRADEMARK OFFICE
Certificate

Patent No. 4,926,041                                                Patented: May 15, 1990

On petition requesting issuance of a certificate of correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
David Wayne Boyd and Steven Lawrance Webb.

Signed and Sealed this ninth Day of October 1990.

DAVID L. WILLIS

*Supervisory Patent Examiner*
*Group Art Unit 255*